Aug. 11, 1942.  W. A. HORNER  2,292,942
POWER RAMMER, PILE DRIVER, AND THE LIKE
Filed June 22, 1940
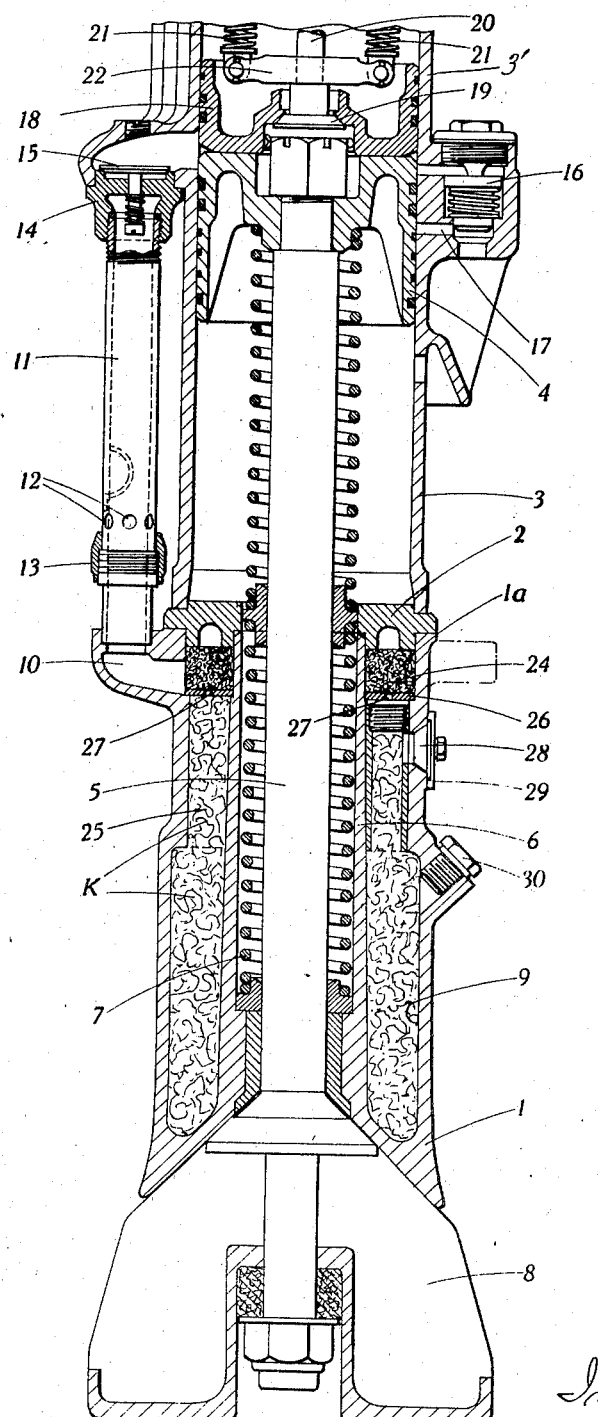

UNITED STATES PATENT OFFICE 2,292,942

POWER RAMMER, PILE DRIVER, AND THE LIKE

William Arthur Horner, Feltham, England, assignor to Pegson Limited, Leicester, England, a British company Application June 22, 1940, Serial No. 341,957
In Great Britain June 23, 1939

3 Claims. (Cl. 123—7)

This invention appertains to power rammers, pile drivers and like tools or apparatus of the kind which are operated wholly or in part by internal combustion and has for its object an improvement in connection with the lubrication of the cylinder walls and internal moving parts of such tools or apparatus as will be hereinafter described.

The invention is applicable to tools or apparatus of the above mentioned kind wherein the cylinder body is impelled upwards on the piston rod by the effect of the internal combustion after which it descends to impart the operative blow.

Primarily the invention is intended for application to internal combustion rammers of the portable hand-guided type such as are used for ramming earth in trenches and elsewhere. Such a rammer in operation leaps bodily upwards and then falls by gravity. Being provided with handles by which it is held during use, a rammer of this kind can be guided and caused to travel by a series of leaps. The invention is not, however, limited to tools of this particular kind; it may, for instance, be applied to a tool or apparatus wherein the cylinder body moves up and down on the piston rod to act as a pile rammer or driver. The expression "power rammer" hereinafter used is to be taken to include generically the different internal combustion tools or apparatus to which the invention may be applicable.

Heretofore in power rammers of the kind concerned either the grease gun and nipple system has been used for lubricating the cylinder walls and such of the internal moving parts as could be conveniently reached by such system, or lubrication has been effected by an automatically operated pump and a system of pipes.

More often than not these power rammers, and especially those of the portable hand-guided type before mentioned, have to work under dirty conditions and it is found by experience that when the grease gun is used, sand, grit and other deleterious foreign matters get forced in with the lubricant, the result of which is that instead of the lubricant reducing wear of the moving parts the said deleterious substances present contribute to the occurrence of excessive wear; consequently repair or renewal of the moving parts is frequently rendered necessary with resultant comparatively high maintenance costs.

The principal object of the invention is to overcome this difficulty and a further object is to enable lubrication of the cylinder walls and internal moving parts of power rammers to be effected in a less troublesome and at the same time a cleaner manner.

The accompanying drawing shows a vertical sectional view of so much of a power rammer of the hand-guided portable type as is necessary to illustrate the provision therein of a baffle or interceptor mass for the intended purpose.

To facilitate the reader's recognition of the known form of rammer illustrated in the drawing a general description of some of the principal parts thereof will first be given. Thus as will be seen, the body component (or cylinder block) 1 of the rammer is surmounted by a ring 2 which serves to support the cylinder 3. The main, i. e., working piston in the cylinder is indicated at 4, and the piston rod 5 passes through a central longitudinal sleeve-like boss 6 formed integrally with the component 1. A main compression spring 7 surrounds the piston rod 5, and the rammer foot 8 is attached to the lower end of the latter. Hence the working piston and the rammer foot are both fastened to the piston rod. The fuel chamber 9 is situated within the lower part of the body component 1 and surrounds the sleeve-like boss 6. At 10 is shown the port which leads to the induction pipe 11. Air inlet holes such as 12 may be formed in this pipe and the admission of air to the latter may be controlled by an air regulator 13 to vary the richness of the mixture admitted to the cylinder. At its upper end the induction pipe is screwed into the seat 14 of the usual spring-controlled inlet suction valve 15. A valve such as 16 controls the exhaust port 17. The cylinder 3 has an upper portion 3′ up and down which an independent piston 18 moves. The piston 18 is entirely separate from the main piston 4 and has no connection or engagement with the piston rod 5. In the bottom of the piston 18 is a central valve 19 the stem 20 of which passes up through a cover (not shown) on the top of the cylinder 3′ and has fastened upon its upper end a yoke or handle bow (not shown) the sides of which are furnished with handles (not shown). Tension springs 21 have their lower ends attached to a fork 22 fastened on the valve stem 20 and their upper ends attached to an overhead structure on the aforesaid cylinder cover. The springs 21 act to lift the valve stem 20 and the associated handles. When the rammer stands upright at rest on the ground, the piston 18 is held up at the top of the cylinder portion 3′ by the valve 19 which is in turn held up by the springs 21. To start the rammer the operator must first move the piston 18 down in cylinder portion 3′. This he does by depressing the handles; in the drawing the said piston is shown in the position it occupies when moved down by depression of the handles. After such depression the handles are allowed to rise under the action of the springs 21 which by lifting the valve stem 20 cause the piston 18 to be moved up by the valve 19. This rise of the piston 18 with the valve 19 closed sucks a charge of explosive mixture into the cylinder 3 through the valve 15. The piston 18 may therefore be regarded as a suction piston. The aforesaid yoke or handle bow, the handles and the overhead structure are not shown since they form no part of the present invention, although the construction described is thought to be well known to those acquainted with the art concerned. In the recessed upper end 1a of the body component 1 there is a metallic mass 24 of annular form composed of knitted wire fabric as hereinafter described. This annular metallic mass 24 constitutes a flame guard the function of which is to prevent back fire or back flash from the induction pipe 11 into the fuel chamber 9. Heretofore in this rammer there has been an annular wick plate fitted into the bottom of the recess 1a and on which the annular metallic mass 24 has rested. This wick plate has been perforated and by means of slots therein has carried lengths of wick which have depended from the wick plate through the upper interior part of the body component into the fuel chamber below and have had their lower ends in contact with the fuel.

Now in the particular rammer shown as made according to the present invention the wicks are omitted and the annular interior space in the body component 1 which space includes the fuel chamber 9 and the interior space 25 above it, is filled with knitted flat wire material K of the same type as that used for the flame guard 24 but whereas the metallic material of the flame guard is closely packed the material in the said interior space is loosely packed, i. e., placed into position with very little pressure. The packing or filling of knitted wire material K may be put into the interior space referred to in annular form such as that previously described, or it may be put in in tubular form (so as to surround the sleeve-like boss 6) and be lightly collapsed and pressed down longitudinally to form the desired mass, or it may as it is put in be coiled or wound about the sleeve-like boss 6 and suitably pressed or spread to fill the interior space. It is to be understood that the material K is merely shown in diagrammatic fashion as also is the material used for the flame guard. The flame guard is used in the rammer as before but instead of the wick plate there is provided beneath said guard an annular plate 26 having a less number of holes 27 than those in the wick plate so that the total area available for passage of the carburetted air through the plate is reduced; holes providing a total area of .900 square inches are suitable. It is preferable that practically the whole of the interior space from beneath the annular plate 26 to the bottom of the fuel chamber 9 shall, as shown, be filled with the loosely packed metallic mass. The body component 1 may be furnished with a single air inlet, or with several air inlets. Preferably, however, only one air inlet such as that indicated at 28 is provided this being situated in the side wall of the upper part of the body at a point below the annular plate 26 and on the opposite side of the body to that where the aforesaid port 10 is disposed. This air inlet consists of a circular opening of suitable size covered by a wire gauze 29 to exclude foreign matter. When this form of the improved rammer is in operation the knitted material K in the interior space is splashed with the fuel/oil mixture, previously put into the chamber 9 by the jump of the body and when thus splashed said material tends to break up the mixture and retain it within its meshes and interstices thus facilitating vaporization of the fuel and enabling it to be sucked from the material into the induction pipe 11 and from thence by way of the inlet valve 15 into the cylinder 3. The metallic mass filling in the interior space also tends to cause the fuel/oil mixture to "creep" up into it and become distributed or vaporized thereby facilitating starting of the rammer "from cold". Therefore under all conditions the mass of knitted material K with which the interior space concerned is packed contributes to the supply of fuel, e. g., petrol vapour in the said space to be drawn upon as required and such action of the mass assists the passage of the lubricant with the fuel.

The filler cap for the chamber 9 is shown at 30.

With a power rammer constructed in accordance with the present invention all that is required for providing for internal lubrication is the addition of a quantity of suitable lubricant to the fuel. The lubricant may be put into the fuel chamber or it may be added to the fuel before this is put into the chamber and when the rammer is in operation the lubricant passes (presumably in the form of a vapour or in a finely divided state or similar condition) with the gaseous mixture through the induction system into the cylinder where it lubricates the walls thereof and the piston or pistons, and it has been found by experiment that lubricant thus admitted spreads to and lubricates other moving parts such as the piston rod and its bearing in the body and also the valve stems.

In a power rammer embodying the invention the oil or other lubricant bears a direct relationship to the amount of fuel consumed and hence, to the work done by the rammer.

The proportion of lubricant to petrol or other fuel for use in the manner herein set forth may be varied according to requirements, kind or grade of lubricant and fuel used and the condition of the power rammer. It is found that with a good brand of petrol and a good grade of engine oil 12 parts of petrol to 1 part of oil is suitable for the intended purpose. This is, of course, merely one example. For mixing with petrol a lubricating oil having a flash point (open test) of not less than 600 degrees is desirable.

It is found that with a fuel/oil system as herein described, after the combustion of the fuel the condensation of oil vapour is sufficient to lubricate the internal moving parts of a power rammer including the suction valve assembly above the suction piston when the rammer is provided with such components.

Thus the grease gun and nipple system or other lubricating system previously employed with power rammers of the kind concerned can be eliminated.

What I claim then is:

1. An internal combustion power rammer comprising, in combination, a body component having a fuel chamber for containing fuel/lubricant mixture, said component being furnished with at least one air inlet, a cylinder on said body component, a working piston in said cylinder, a rod associated with the piston, the rammer functioning by reason of the body component being impelled upwards on the piston rod by the effect of the internal combustion and thereafter descending to impart the operative blow, an induction system which extends from the fuel chamber to the cylinder and serves to admit explosive mixture into the latter, a flame guard located between the fuel chamber and the induction system, a perforated support for the flame guard, and, in the interior space beneath said perforated support, an interceptor mass of material which is capable of facilitating vaporization of fuel/lubricant mixture from the fuel chamber, the arrangement being such that air for induction is caused to pass through the mass, for the purpose herein specified, said interceptor mass being loosely compacted and the flame guard comprising a mass of material compacted closely relative to the interceptor mass.

2. An internal combustion power rammer comprising, in combination, a body component having a fuel chamber for containing fuel/lubricant mixture, said component being furnished with at least one air inlet, a cylinder on said body component, a working piston in said cylinder, a rod associated with the piston, the rammer functioning by reason of the body component being impelled upwards on the piston rod by the effect of the internal combustion and thereafter descending to impart the operative blow, an induction system which extends from the fuel chamber to the cylinder and serves to admit explosive mixture into the latter, a flame guard which consists of closely packed knitted wire fabric and is located between the fuel chamber and the induction system, a perforated support for the flame guard, and an interceptor mass of loosely packed knitted wire fabric which is capable of facilitating vaporization of fuel/lubricant mixture from the fuel chamber, the arrangement being such that air for induction is caused to pass through the metallic mass, for the purpose herein specified.

3. In an internal combustion rammer, a cylinder block including an outer wall, an axially disposed sleeve and a closure for the bottom of the space between the sleeve and outer wall, said space constituting a fuel chamber, a cylinder on the block in axial alinement therewith, a piston slidable in said cylinder, a piston rod extending from the piston through said sleeve, a rammer foot on the lower end of the rod, a perforated plate covering the upper end of the fuel chamber, said block having a lateral port above said plate, a flame guard supported on said plate and covering said port, an air mixing device provided with an intake valve and affording communication between said port and the cylinder above the piston, and a splash preventing and evaporation assisting mass of loosely compacted material filling the fuel chamber, said flame guard consisting of a mass of material more tightly compacted than the last mentioned mass.

WILLIAM ARTHUR HORNER.